Nov. 22, 1960   R. J. SPRAVKA   2,960,892
DRILLING TOOL
Filed March 9, 1959
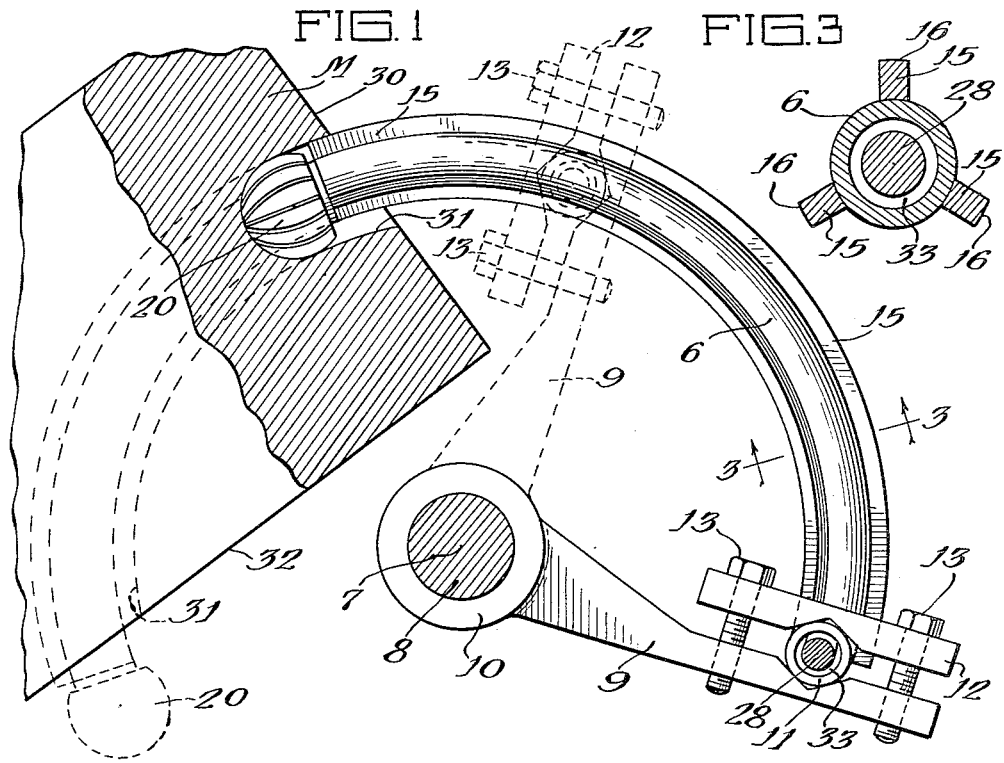
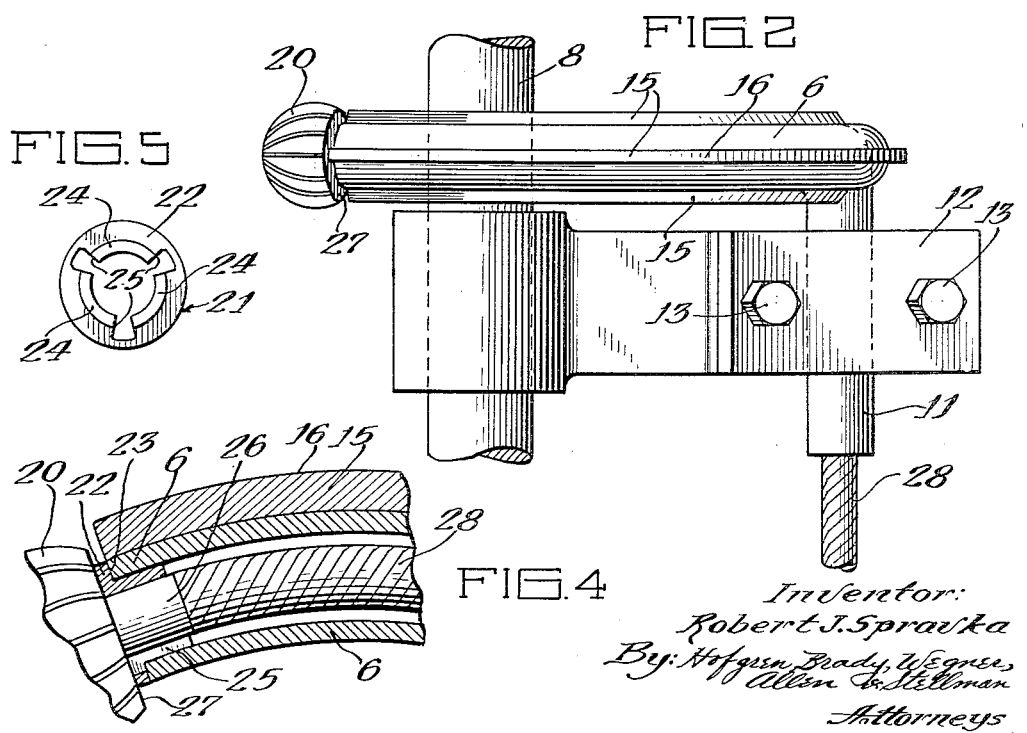
Inventor:
Robert J. Spravka
By: Hofgren Brady, Wegner,
Allen & Stellman
Attorneys

United States Patent Office 2,960,892
Patented Nov. 22, 1960

2,960,892
DRILLING TOOL

Robert J. Spravka, 453 East Court, Elmhurst, Ill.

Filed Mar. 9, 1959, Ser. No. 798,155

5 Claims. (Cl. 77—15)

This invention relates to a drilling tool and more particularly to a new and improved tool for drilling a curved bore.

The desirability of drilling an arcuate or curved bore may depend on a number of factors. The aircraft industry is particularly concerned with the weight of all castings forming a part of an aircraft. In the past, castings have had to be made sufficiently large to accommodate straight drilled passages which intersect and are drilled from the exterior of the casting. In order to get a passage, certain of the points at which the drills penetrate the castings would be plugged so as to leave a number of connected straight bores or drilled passages around or through a particular casting. The use of a curved or arcuate drilling tool would, in many instances, permit the reduction of the weight of a casting and save some space.

Attempts to use cores, particularly in relatively small sizes, in castings have often required the support of the cores intermediate their ends. In such instances, the casting has been made more difficult and costly because of the complicated problem of supporting relatively small cores. Here also, an arcuate drilling tool may often be substituted for the core. A part of the difficulty in using curved drilling tools is believed to be the difficulty in maintaining any accuracy. Curved drilling tools have been previously suggested but the industry, in general, has not adopted them. The difficulties encountered with the tools available are overcome by the subject of the present invention.

It is therefore the principal object of this invention to provide a new and improved drilling tool and more particularly a drilling tool provided with guiding means for maintaining the accuracy of location of a drilled bore.

Another object is to provide a curved drilling tool having a supporting structure for a drilling burr with guiding means closely adjacent to the burr.

Another object is to provide a drilling tool comprising a composite structure lending rigidity to the curved tool and resistance to bending stresses.

A further object is to provide a tool which has means permitting ready lubrication of the drilling burr, as well as cooling thereof, and the carrying of chips out of the bore.

Further objects, features and advantages of the present invention will become apparent from the following description of a preferred embodiment illustrated in the accompanying drawings, in which:

Figure 1 is a bottom plan view of a drilling tool and part of an associated fixture showing the tool in solid lines beginning a drilling operation in material and, in dotted lines, the completed drilling operation;

Figure 2 is a broken elevational view of the tool shown in Figure 1;

Figure 3 is a sectional view through the tube of the drill taken substantially along line 3—3 in Figure 1;

Figure 4 is a fragmentary enlarged sectional view through the end of the drilling tool adjacent the burr, and Figure 5 is a plan view of the bearing support for the burr removed from the tool.

The drilling of lightweight alloys, as used in the aircraft and other industries, may often be more easily accomplished than the drilling of the harder materials, such as steel. It is contemplated that the present drilling tool will be particularly useful in sizes ranging generally from about one-fourth inch diameter up to as much as one inch diameter of the bore so drilled. In general, the drilling tool is an arcuate member having a burr at its forward end and supported exteriorly of the piece to be drilled. A fixture is provided for turning the drill about an axis coincident with the center of curvature of the tool.

Referring particularly to the figures of the drawing, the drilling tool comprises a hollow metal tube 6 curved to lie on an arc about a center line 7 coincident with the center of a shaft 8. The metal tube 6 may have a length dictated by the length of bore to be drilled. Sufficient added length is necessary to provide support for the tool and area for gripping the same to carry it during its drilling operation. In the view of Figure 1, a simple form of fixture having an arm 9 attached to a hub 10 secured to the shaft 8 is clamped to an upwardly extending portion 11 of the tube by a clamp bar 12 and machine screws 13. The extension 11 of the tube is shown at approximately a right angle to the arcuate portion 6 of the hollow tube; however, this angle may be varied or the portion 11 may comprise simply an extension of the arcuate tube 6 without any bending.

The curved portion of the tool itself is provided on its exterior with a plurality of reinforcing ribs 15. In the present embodiment, three ribs 15 are attached to the exterior of the tube 6 and spaced equidistant apart. The ribs are preferably formed of a tool hardened steel and cut to shape rather than bent from straight stock, although the latter method of forming them may be followed in certain instances. The ribs are secured as by brazing, welding or otherwise adhering them to the outer surface of the tube. The tube itself may be made of a softer metal and is generally bent from straight form to an arcuate form shape on a predetermined radius of curvature. The attachment of the ribs to the tube makes the ribs and tube act together, the ribs reinforcing and aiding the tube to resist bending stresses tending to move it out of its predetermined arcuate shape.

Each of the ribs has an outer surface 16 which is formed arcuately from side-to-side of the rib and is arranged to be coincident with the circumference of a circle having its center coincident with the center of the tube. The size of the ribs may be chosen as just slightly smaller than the bore to be formed so that the ribs may slide in the bore giving lateral support to the drilling burr.

The structure mounting a drilling burr, such as 20, includes a bearing 21 shown specifically in Figures 4 and 5. The bearing has an outwardly extending flange 22 intended to abut against the end 23 of the tube 6. An upwardly extending tubular part of the bearing is divided into three arcuate sections 24 by intervening slots 25 passing through the flange 22. These slots are oriented with tube 6 so as to fall in the area between adjacent ribs 15. The burr is provided with a shank 26 mounted within the upstanding cylindrical part of the bearing and the rearward face 27 of the burr bears against the flange 22 of the bearing. The bearing thus serves to locate the burr both laterally and longitudinally of the arcuate tube.

A drive to the burr is accomplished by means of a flexible shaft 28 extending through the arcuate tube 6 and its extension 11 to a source of motive power (not shown). Any suitable driving force may be used, an electric motor being most common.

Referring particularly to Figure 1, a drilling operation may start into material M at a face 30 thereof. An additional guide having an arcuate bore therein on the same radius as the radius of the tool may be used initially at the starting of the drilling operation, if desired. In the lighter metal alloys, such additional guiding is generally unnecessary in order to start the bore. As the burr 20 proceeds into the material, a bore 31 is formed which is only slightly larger in diameter than the circle inscribing the outer surfaces 16 of the ribs. The ribs engage the surface of the bore and slide therealong to give lateral support to the drilling burr as it progresses through the material. An accurately positioned bore 31 may be formed between the surface 30 and the surface 32 in the material M, as illustrated by the dotted lines in Figure 1. During the drilling operation, lubricating and cooling fluid may be pumped through the interior of the tube in the space 33 between the tube and flexible shaft. Such fluid would exit the tube past the rear surface 27 of the burr, having passed through the slots 25 in the bearing. Removed metal chips may be carried by the fluid rearwardly through the bore 21 in the space between the outstanding ribs 15 and exit the material at the surface 30. The ribs, in conjunction with the bore, form three passages through which the material may be pumped at high velocity.

The particular radius for which a bore is to be drilled will require that the tool be curved to that same radius. It is contemplated that in addition to a purely arcuate bend in the tube 6 and its guiding and supporting ribs 15, that a drilling tool of the nature disclosed may be made in a spiral segment form. Additionally, while the ribs have been shown continuous throughout the length of the arcuate tube, it is important to provide lateral support as closely adjacent the burr at the adjacent end of the tube, whereas the more rearward portions of the ribs may be changed or omitted as required by the amount of lateral support found desirable in a particular material.

The foregoing detailed description has been given for clearness of understanding only and no unnecessary limitations are to be understood therefrom for some modifications will be obvious to those skilled in the art.

I claim:
1. A drilling tool for use in producing a curved bore, comprising: a hollow tube having an arcuate axis and carrying an annular bearing at one end; a drilling burr mounted for rotation in said annular bearing about an axis coincident with said arcuate axis, said drilling burr having an inscribing circumference greater in diameter than the diameter of said hollow tube for forming a bore larger than the tube, a flexible drive shaft extending through said tube and connected to said burr for rotating the burr; and a plurality of ribs on the exterior of the tube extending longitudinally of and outwardly from the tube, said ribs having outer arcuate surfaces extending longitudinally of the hollow tube for slidably engaging the surface of a bore cut by the burr, said ribs having their forward ends adjacent said annular bearing for guiding the burr during advance of the tool into material being drilled.

2. A drilling tool as specified in claim 1 wherein at least three ribs extend outwardly from the tube and are substantially equidistant from each other, said ribs being continuous from the end of the tube adjacent said burr over the length of said arcuate tube.

3. A drilling tool as specified in claim 1 wherein each rib on the tube is a hardened steel member separate from the tube and attached to the tube at its inner surface, said ribs each having its outer arcuate surface formed to lie on the circumference of a circle having its center coincident with the center of said tube.

4. A drilling tool for providing a curved bore in material, comprising: an arcuate hollow tube carrying a bearing at one end; a drilling burr mounted for rotation in said bearing and arranged as an extension of the arcuate shape of said tube; a flexible drive shaft connected to said burr and extending longitudinally through said tube for providing driving rotation to the burr; and outwardly extending ribs on said tube end adjacent the burr, said ribs having outer arcuate surfaces lying on the circumference of a circle having its center on the center of the tube and extending longitudinally of the tube, said outer rib surfaces being engageable in the bore drilled by said burr to guide the burr during further advance into the material being drilled.

5. A drilling tool as specified in claim 4 wherein the tube and ribs are dissimilar metal members joined together at the base of said ribs with said ribs being stiff, relatively unyielding, material to hold the tube in said arcuate shape.

References Cited in the file of this patent

UNITED STATES PATENTS

| | | |
|---|---|---|
| 550,783 | Elliott et al. | Dec. 3, 1895 |
| 1,644,197 | Marty | Oct. 4, 1927 |
| 1,940,220 | McGrath | Dec. 19, 1933 |
| 2,418,021 | Fleischer | Mar. 25, 1947 |